April 6, 1948.   L. A. HABICHT ET AL   2,439,363
GAP GAUGE FOR SPARK PLUGS
Filed Jan. 15, 1945
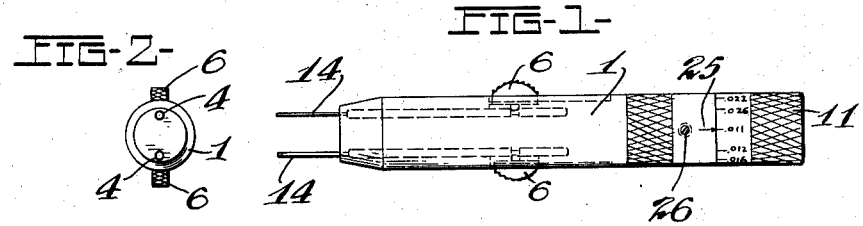
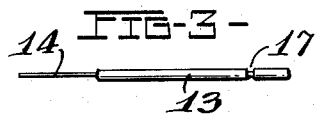
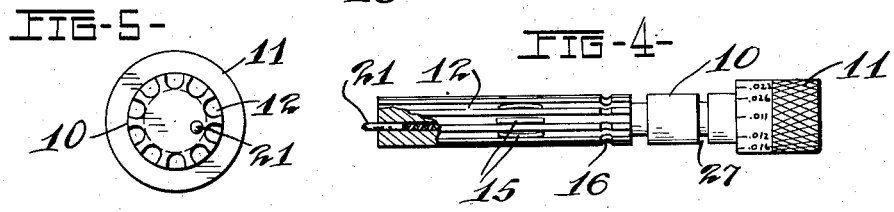
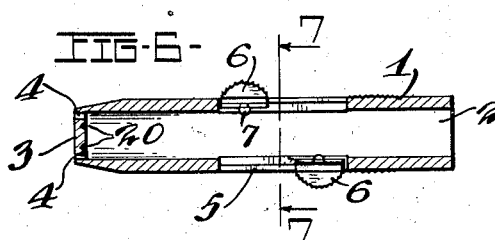
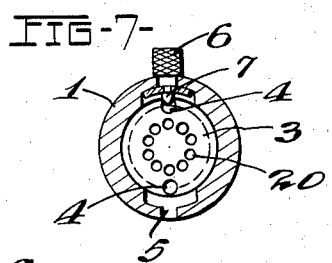
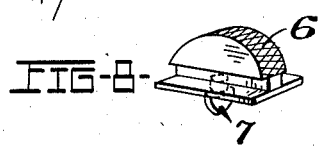
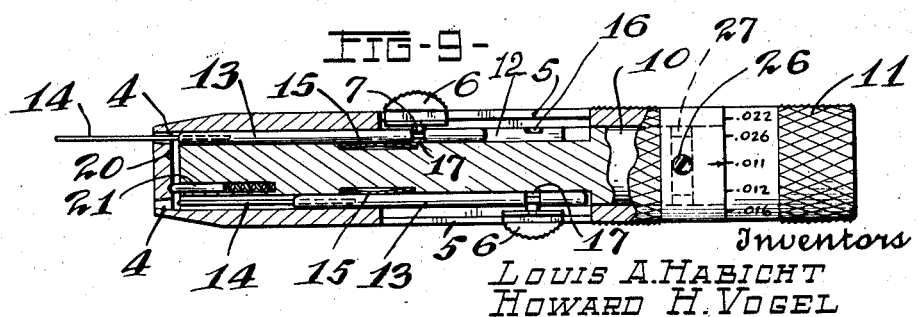
Inventors
LOUIS A. HABICHT
HOWARD H. VOGEL
By Owen & Owen
Attorneys Patented Apr. 6, 1948

2,439,363

UNITED STATES PATENT OFFICE 2,439,363

GAP GAUGE FOR SPARK PLUGS

Louis A. Habicht and Howard H. Vogel, Toledo, Ohio, assignors to Champion Spark Plug Company, Toledo, Ohio, a corporation of Delaware Application January 15, 1945, Serial No. 572,952

8 Claims. (Cl. 33—168)

This invention relates to gauges, and particularly to those of the type having one or more pairs of associated gauge wires or members for determining the minimum and maximum limits of the sparking gaps to spark plugs.

In the adjusting of spark plug gaps, it is a requirement, particularly with plugs used in aviation engines, to gauge the gaps both for minimum and maximum requirements and to only use plugs having gaps coming within such limits.

An object of the invention is the provision of a spark gap gauge having at least one pair of gauge elements for measuring the minimum and maximum of a particular gap and which are adapted to be retracted within a holder or projected in usable position therefrom.

Another object is the provision of a gauge of this character having a plurality of pairs of associated gauge elements selectively operable to be projected into usable position for measuring the minimum and maximum limits of predetermined gaps.

Another object is the provision of a gauge of this character having a plurality of pairs of associated gauge elements selectively operable to be projected into usable position for measuring the minimum and maximum limits of predetermined gaps, the elements of all other pairs being locked against projection for use until the elements of any previously operated pair have been retracted from usable position.

Another object of the invention is the provision in a gauge of the wire type, of means for carrying the wires and rendering them adjustable whereby they may be projected to usable position from a holder or retracted to inoperative position therein, thus enabling the gauge to be carried in the pocket or in a tool case without harm to the tool or the carrier and be readily available for use at any time.

The invention is fully described in the following specification, and a preferred embodiment thereof illustrated in the accompaning drawings, in which—

Figure 1 is a side elevation of a gauge embodying the invention, showing a pair of gauge wires projected for use; Fig. 2 is a front end view thereof; Fig. 3 is a side elevation of one of the gauge wires with its carrying bar; Fig. 4 is a side elevation of the magazine for carrying a plurality of gauge members, with a part broken away; Fig. 5 is an enlarged front end view thereof; Fig. 6 is a central longitudinal section of the barrel or holder member in which the magazine is mounted, with the gauge wire operating slides in connection therewith; Fig. 7 is an enlarged cross-section of the gauge taken on the line 7—7 in Fig. 6, with parts in full; Fig. 8 is a perspective view of one of the slide members; and Fig. 9 is an enlarged central longitudinal section of the gauge with one gauge wire projected.

Referring to drawings, 1 designates a cylindrical holder or barrel having a longitudinal bore 2 therein that is open at one end and is closed at its other end, as at 3, except for a pair of small holes 4 therein. A pair of longitudinally extending slots 5 are provided through the wall of the barrel 1 in circumferentially spaced relation corresponding to the spacing of the holes 4 so that each slot is substantially in register with a respective hole lengthwise of the barrel. A manually controlled slide 6 is mounted in each slot for movement lengthwise thereof and each slide has at its inner side a pin 7 projecting into the barrel 2 and at its outer side an exposed roughened portion to facilitate movement of the slide by a finger or thumb of a hand grasping the barrel.

A cylindrical magazine 10 is rotatably mounted in the barrel bore 2 and has a head 11 at the rear open end of the bore which is preferably the diameter of the barrel and shoulders against its end. The body portion of the magazine which fits in the bore, is provided with a plurality of circumferentially spaced longitudinally extending surface grooves 12 in each of which a gauge wire holder 13 of bar-form is mounted for longitudinal reciprocatory movements, being guided in such movements by its groove. A gauge wire 14 of a particular size is carried by and projected from the forward end of each bar 13 in position to be projected outwardly through one of the holes 4 with which it may be in longitudinal register. Each bar 13 and its wire are of a combined length to adapt them to be entirely contained within the barrel in a groove 12 in which disposed when the bar is in retracted position. The magazine is rotatable in the barrel to place any gauge wire in register with one or the other of the holes 4, so as to be projected therethrough upon an outward movement of the carrying bar. Movement of the bars is yieldingly resisted by one or more springs 15 in the magazine.

The magazine 10 is provided near its rear end with a circumferential groove 16 in intersecting relation to the grooves 12 and each bar 13 likewise has a cross groove or recess 17 therein near its rear end and in register with the groove 16 when the bar and its wire 14 are in full retracted positions.

When each slide 6 is at the rear end of its guide slot, its pin 7 registers with the groove 16 and permits a complete turning of the magazine 10 in the barrel providing all of the bars 13 are retracted so that their grooves 17 register with the magazine groove 16. The pins 7 are of slightly less width than the longitudinal grooves 12 so that when engaged within a bar groove 17 the slides may be moved lengthwise of the barrel to effect an outward movement of the engaged bar and to cause its gauge wire to be projected outward through the registering hole 4 which is positioned relative to the slide movement for such purpose. When either slide has been moved forward out of register with the groove 16, its pin 7 engages the side walls of the groove 12 in which disposed, thus locking the magazine against turning until the slide has again been returned to full retracted position.

The closed end 3 of the barrel is provided at its inner side with a circular series of depressions 20 corresponding in number and spacing to the grooves 12, and a spring pressed detent 21 carried by the magazine at its forward end successively engages these depressions as the magazine is rotated so as to yieldingly hold the magazine in any position of rotary adjustment with a predetermined gauge wire in register with a hole 4.

The gauge wires 14 with their bars 13 are carried in predetermined pairs by the magazine 10 in position for the wires of any pair to be projected outward to usable positions through the holes 4 when the magazine is in a proper position of rotary adjustment therefor. While any number of pairs of gauge wires may be provided for which the size of the magazine is suitable, in the present instance there are five pairs of these wires with the wires of each pair disposed in diametrically opposed positions. The gauge sizes of the wires are indicated on the head exposed portion 11 of the magazine, such designations being arranged in circumferentially spaced relation around the head and each having an indicating line or point for register with a line 25 (Fig. 1) on the rear end portion of the barrel or holder 1. As previously stated, the gauge wires as well as their designation numbers are arranged in pairs with the wire of one pair being of proper size, for instance a ".011" gauge for determining the minimum spacing requirements of a gap, while the companion wire of the pair would be proper for a ".014" gauge to determine the maximum spacing of a spark gap. Should it be desired to measure a gap, the minimum and maximum spacing requirements of which are ".011" and ".014," respectively, the head 11 will be turned for the ".011" indication thereon to register with the line 25 and this would automatically place the two gauge wires corresponding to such measurements in position to be projected through the holes 4. Likewise, if the minimum and maximum spacing requirements were suitable for measurement by ".016" and ".020" wires, the magazine would be turned so that ".016" registered with the line 25, which would place the wires of such sizes in position to be projected through the holes 4. The gauge wire sizes preferable for use in pairs for the minimum and maximum measurements of spark plug gaps are .011 and .014; .012 and .013; .016 and .020; .018 and .022; .024 and .025. When any pair of wires is turned into position to be projected from the holder, such projection may be effected by merely moving the slides 6 forward in their slots. The movement of either slide to effect a projection of a gauge wire will move the slide pin 7 lengthwise in a magazine groove 12 and out of register with the circumferential groove 16, thereby locking the magazine against turning relative to the barrel until the projected wires have been retracted within the holder so as to again place the lock pin 7 in register with the groove 16. The barrel 1 and magazine 10 are retained in assembled relation for relative rotary movements by a screw 26 in the barrel engaging within a circumferential groove 27 in the magazine.

It will be understood that while in the present instance the wires of each pair are disposed in diametrically opposed relation with respect to the holder axis and the indicating measurements therefor positioned accordingly on the knob portion 11 of the magazine, the wires and measurements may be in any other suitable arrangement as may be desired or convenient.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. A spark plug gap gauge having a barrel-like holder, a pair of companion gauge wires for predetermined minimum and maximum gap spacing requirements mounted in said holder and manually movable to project the wires to usable positions without the holder or to retract them entirely within the holder, and means projecting without a side of the holder and operable to impart projecting or retracting movements to the wires.

2. A spark plug gap gauge having a barrel-like holder, a magazine rotatably mounted in said holder, a plurality of pairs of companion gauge wires carried by the magazine for rotary movements therewith and for reciprocatory movements lengthwise thereof, the former to place the wires in predetermined position relative to the holder and the latter to project the wires into usable position from the holder, and means projecting without the holder and operable to selectively project and retract the wires relative to the holder and magazine.

3. A spark plug gap gauge having a barrel-like holder, a magazine mounted in said holder, a plurality of gauge members carried by the magazine for movements lengthwise thereof to project or retract the members relative to the holder, and means operable to selectively engage the members to impart projecting or retracting movements thereto.

4. A spark plug gap gauge including a barrel-like holder, a magazine mounted in said holder, a plurality of gauge members carried by the magazine for movements lengthwise thereof to project or retract the members relative to the holder, said magazine being rotatable within the holder to selectively place predetermined gauge wires in positions to be projected, and means operable to engage the members when in projecting position to impart projecting or retracting movements thereto and to lock the magazine against rotation in the holder except when the members are in retracted positions.

5. In a spark plug gap gauge, a holder, a magazine, a plurality of associated pairs of members for minimum and maximum gauge requirements of a spark gap carried by the magazine for movements relative thereto into and out of usable position, said holder and magazine being carried one by the other and relatively rotatable to selectively place the pairs of said members in predetermined shiftable relation to the holder, and means operable to project a pair of gauge members to usable position and also to retract them when in predetermined shiftable relation to the holder.

6. In a spark plug gap gauge, a holder, a magazine having a plurality of circumferentially spaced longitudinally extending passages, a gap gauge member mounted in each of said passages for movements lengthwise of the magazine to project or retract the member relative to the holder, said magazine being rotatably carried by the holder to selectively place each member in a predetermined position relative to the holder for such movements, and means operable to engage and effect a projection or retraction of a member when in such position and also to lock the magazine against movement relative to the holder except when the engaged member is in one position of its movement relative to the magazine.

7. In a spark plug gap gauge, a barrel-like holder having two holes in one end, a magazine having a plurality of circumferentially spaced longitudinally extending passages therein, said magazine being rotatable in the holder to place the passages of predetermined pairs in register with respective of said holes, a gap gauge member slidable in each passage to be enclosed within the holder or projected in usable position therefrom through a registering hole, and slide means movably mounted on the holder and operable to cause a projection or retraction of any predetermined pair of said members when in register with said holes and to lock the magazine against movement during such movements of the members.

8. In a spark plug gap gauge, a barrel-like holder having two holes in one end, a magazine having a plurality of circumferentially spaced longitudinally extending passages therein, said magazine being rotatable in the holder to place the passages of predetermined pairs in register with respective of said holes, a gap gauge member slidable in each passage to be enclosed within the holder or projected in usable position therefrom through a registering hole, and a slide carried by the holder in association with each hole and being operable to project a registering member through a hole with which it registers or to retract the member within the holder and to lock the magazine and holder against relative rotary movements except when the slide and an engaged member are in retracted positions.

LOUIS A. HABICHT.
HOWARD H. VOGEL.

REFERENCES CITED

The following references are of record in the file of this patent:

UNITED STATES PATENTS

| Number | Name | Date |
| --- | --- | --- |
| 1,806,580 | Barth | May 26, 1931 |
| 2,313,174 | Shock | Mar. 9, 1943 |

FOREIGN PATENTS

| Number | Country | Date |
| --- | --- | --- |
| 593,289 | France | 1925 |